United States Patent
Ouyang (10) Patent No.: US 10,110,037 B2
(45) Date of Patent: Oct. 23, 2018

(54) BATTERY CHARGING CIRCUIT, CONTROL CIRCUIT AND ASSOCIATED CONTROL METHOD

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/873,783

(22) Filed: Jan. 17, 2018

(65) Prior Publication Data

US 2018/0212437 A1    Jul. 26, 2018

(30) Foreign Application Priority Data

Jan. 24, 2017   (CN) .......................... 2017 1 0059340

(51) Int. Cl.
  *H02M 3/335* (2006.01)
  *H02J 7/00* (2006.01)
  *H02M 3/157* (2006.01)
  *H02M 3/158* (2006.01)

(52) U.S. Cl.
  CPC ............ *H02J 7/007* (2013.01); *H02J 7/0052* (2013.01); *H02M 3/157* (2013.01); *H02M 3/1582* (2013.01); *H02M 3/1584* (2013.01)

(58) Field of Classification Search
  CPC .... H02M 3/00; H02M 3/156; H02M 3/33507; H02M 3/33523
  See application file for complete search history.

(56) References Cited

U.S. PATENT DOCUMENTS

| | | |
|---|---|---|
| 8,773,090 B2 | 7/2014 | Ouyang |
| 9,270,178 B2 | 2/2016 | Jiang |
| 2016/0226264 A1* | 8/2016 | Xu ........................... H02J 7/007 |
| 2016/0315535 A1 | 10/2016 | Ouyang |

\* cited by examiner

*Primary Examiner* — Adolf Berhane
*Assistant Examiner* — Afework Demisse
(74) *Attorney, Agent, or Firm* — Perkins Coie LLP (57) ABSTRACT

A battery charging circuit receives an input current, and provides a system voltage and a charging current to charge a battery. A control circuit used to control the battery charging circuit has a charging current control loop providing a compensation signal, an inductor current control loop providing a first loop control signal, and a system voltage control loop providing a second loop control signal. The control circuit provides an inductor current reference signal based on the compensation signal and a designed maximum input current level. And the control circuit provides a control signal based on the first loop control signal the second loop control signal to control the battery charging circuit.

20 Claims, 8 Drawing Sheets

BATTERY CHARGING CIRCUIT, CONTROL CIRCUIT AND ASSOCIATED CONTROL METHOD

CROSS-REFERENCE TO RELATED APPLICATION

This application claims the benefit of CN application No. 201710059340.5, filed on Jan. 24, 2017, and incorporated herein by reference.

TECHNICAL FIELD

The present invention relates to electrical circuit, more particularly but not exclusively relates to battery charging circuit.

BACKGROUND

With development of the electronic technical, a computing system is widely used. For example, from handheld electronic equipments (e.g., tablet personal computer, e-book, digital camera, and so on), to large electronic equipments (e.g., server, computing base station, and so on), all require the computing system. A computing platform comprises a central processing unit (CPU) and other components. The CPU is utilized to interpret machine readable instructions and process all data in the computing system. A voltage regulator is needed to power the CPU. And a battery is utilized to provide power to the voltage regulator when the computing platform disconnects from an external power source. Thus, a battery charging circuit is also needed to provide a system voltage to the voltage regulator and charge the battery when the computing platform connects to the external power source.

As user requirements increasing, the CPU needs to boost performance at times, e.g., increasing an operating frequency. However, instantaneous power needed by the CPU may increase dramatically to support the boosted performance. Thus, the battery charging circuit should be designed to satisfy demands of instantaneous power consumption.

SUMMARY

It is one of the objects of the present invention to provide battery charging circuit, control circuit and associated control method.

One embodiment of the present invention discloses a control circuit for a battery charging circuit, the battery charging circuit comprising a switching circuit having an inductor, the switching circuit has an input terminal configured to receive an input current and an output terminal configured to provide a system voltage, the output terminal of the switching circuit is further coupled to a battery to provide a charging current, the control circuit comprising: a charging current control loop, configured to receive a charging current feedback signal representative of the charging current, and configured to provide a compensation signal based on a differential between the charging current feedback signal and a charging current reference signal; an amplitude limiting circuit, coupled to the charging current control loop to receive the compensation signal, and configured to provide an inductor current reference signal based on the compensation signal and a designed maximum input current level, wherein amplitude of the inductor current reference signal is limited based on the designed maximum input current level; an inductor current control loop, configured to receive the inductor current reference signal and an inductor current feedback signal representative of an inductor current flowing through the inductor, and configured to provide a first loop control signal via comparing the inductor current feedback signal with the inductor current reference signal; a system voltage control loop, configured to receive a system voltage feedback signal representative of the system voltage, and configured to provide a second loop control signal via comparing the system voltage feedback signal with a system voltage reference signal; and a switching control circuit, configured to receive the first loop control signal and the second loop control signal, and configured to provide a control signal to control the switching circuit based on the first loop control signal and the second loop control signal.

Another embodiment of the present invention discloses a battery charging circuit, comprising: a switching circuit, having an inductor, the switching circuit has an input terminal configured to receive an input current and an output terminal configured to provide a system voltage, the output terminal of the switching circuit is further coupled to a battery to provide a charging current; a charging current control loop, configured to receive a charging current feedback signal representative of the charging current, and configured to provide a compensation signal based on a differential between the charging current feedback signal and a charging current reference signal; an amplitude limiting circuit, coupled to the charging current control loop to receive the compensation signal, and configured to provide an inductor current reference signal based on the compensation signal and a designed maximum input current level; an inductor current control loop, configured to receive the inductor current reference signal and an inductor current feedback signal representative of an inductor current flowing through the inductor, and configured to provide a first loop control signal via comparing the inductor current feedback signal with the inductor current reference signal; a system voltage control loop, configured to receive a system voltage feedback signal representative of the system voltage, and configured to provide a second loop control signal via comparing the system voltage feedback signal with a system voltage reference signal; and a switching control circuit, configured to receive the first loop control signal and the second loop control signal, and configured to provide a first control signal to control the switching circuit based on the first loop control signal and the second loop control signal.

Yet another embodiment of the present invention discloses a control method for a battery charging circuit, the battery charging circuit comprising a switching circuit having a switch and an inductor, the switching circuit has an input terminal configured to receive an input current and an output terminal configured to provide a system voltage, the output terminal of the switching circuit is further coupled to a battery to provide a charging current, the control method comprising: providing a compensation signal based on a differential between a charging current feedback signal and a charging current reference signal, wherein the charging current feedback signal is provided based on the charging current; providing a maximum inductor current level based on a designed maximum input current level; providing an inductor current reference signal based on the compensation signal and the maximum inductor current level, wherein amplitude of the inductor current reference signal is limited no more than the maximum inductor current level; providing a first loop control signal via comparing an inductor current feedback signal with the inductor current reference signal, wherein the inductor current feedback signal is provided based on an inductor current flowing through the inductor; providing a second loop control signal via comparing a system voltage feedback signal with a system voltage reference signal, wherein the system voltage feedback signal is provided based on the system voltage; and providing a control signal to control the switching circuit based on the first loop control signal and the second loop control signal.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to a battery charging circuit configured to receive an input current, and configured to provide a system voltage and a charging current to charge a battery, a control circuit and associated control method. The control circuit comprises a charging current control loop configured to provide a compensation signal, an inductor current control loop configured to provide a first loop control signal, and a system voltage control loop configured to provide a second loop control signal. The control circuit is configured to provide an inductor current reference signal based on the compensation signal and a designed maximum input current level. And the control circuit provides a control signal based on the first loop control signal the second loop control signal to control the battery charging circuit. The battery charging circuit has fast transient response and improved stability meanwhile.

Figure 1:
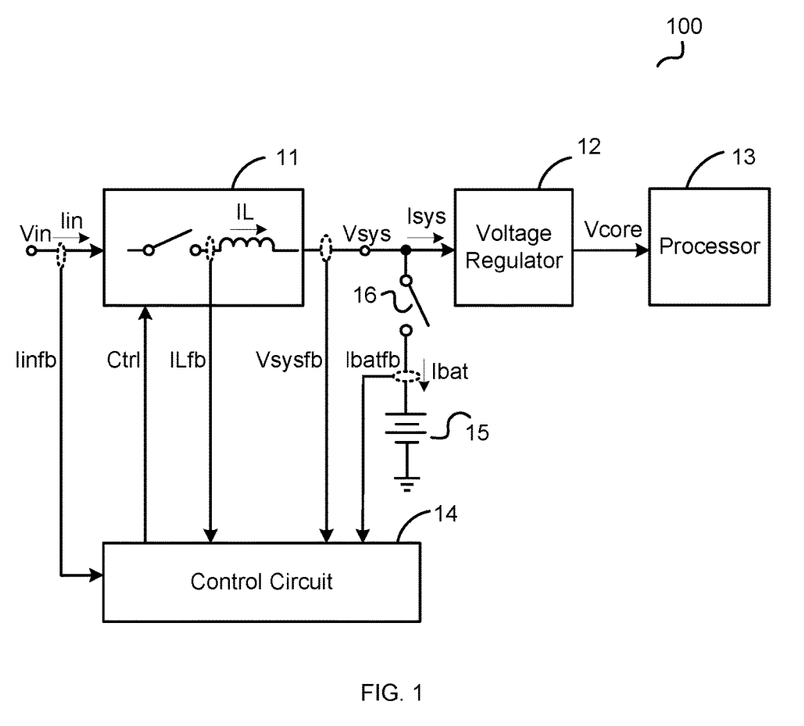
FIG. 1 illustrates a circuit block diagram of a system 100 according to an embodiment of the present invention.

FIG. 1 illustrates a circuit block diagram of a system 100 according to an embodiment of the present invention. System 100 has a battery charging circuit, a voltage regulator (VR) 12, a battery 15 and a processor 13. The battery charging circuit comprises a switching circuit 11, a switch 16, and a control circuit 14. Processor 13 may be a CPU, a graphics processing unit (GPU) or an application specific integrated circuit (ASIC). In one embodiment, system 100 is part of a computing platform, the battery charging circuit, battery 15, and voltage regulator 12 provides power to the computing platform. One or both of the battery charging circuit and battery 15 provides a system voltage Vsys to the computing platform. Voltage regulator 12 converts system voltage Vsys to a processor voltage Vcore to processor 13. Switching circuit 11 has an input terminal configured to receive an input voltage Vin and an input current Iin, and an output terminal configured to provide system voltage Vsys. When switching circuit 11 connects to an external power source (e.g., an adapter, an alternating-current source or a direct-current source), system voltage Vsys is provided by switching circuit 11, and battery 15 is charged by switching circuit 11 through switch 16 with a charging current Ibat. When switching circuit 11 disconnects from the external power source, input voltage Vin switching circuit 11 received is zero volt, and system voltage Vsys is provided by battery 15 through switch 16. Switching circuit 11 comprises at least one switch and an inductor coupled to the at least one switch. Control circuit 14 receives a plurality of feedback signals of the battery charging circuit, and provides a control signal Ctrl to control switching circuit 11 (e.g., control the at least one switch) based on the plurality of feedback signals. The plurality of feedback signals may comprise one or more of an inductor current feedback signal ILfb representative of an inductor current IL flowing through the inductor, a system voltage feedback signal Vsysfb representative of system voltage Vsys, a charging current feedback signal Ibatfb representative of charging current Ibat, and an input current feedback signal Iinfb representative of input current Iin.

Figure 2:
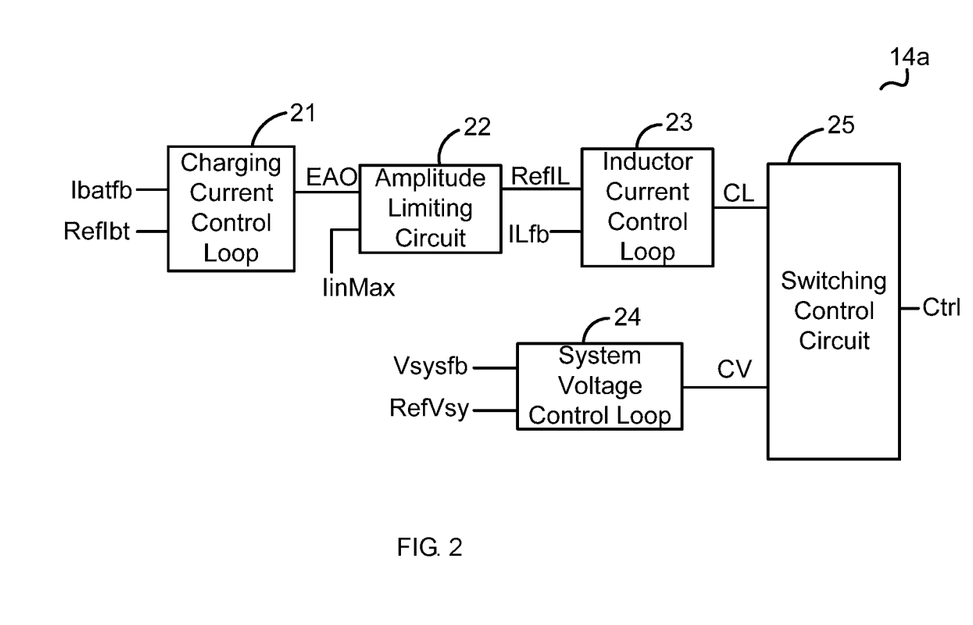
FIG. 2 schematically illustrates a control circuit 14a according to an embodiment of the present invention.

FIG. 2 schematically illustrates a control circuit 14a according to an embodiment of the present invention. Control circuit 14a comprises a charging current control loop 21, an amplitude limiting circuit 22, an inductor current control loop 23, a system voltage control loop 24, and a switching control circuit 25. Charging current control loop 21 receives charging current feedback signal Ibatfb and a charging current reference signal Reflbt, and provides a compensation signal EAO based on a differential (Reflbt−Ibatfb) between charging current feedback signal Ibatfb and charging current reference signal Reflbt. Amplitude limiting circuit 22 is coupled to charging current control loop 21 to receive compensation signal EAO and a designed maximum input current level IinMax, and provides an inductor current reference signal RefIL based on compensation signal EAO and the designed maximum input current level IinMax. The designed maximum input current level IinMax represents a designed maximum input current Iin. In one embodiment, amplitude limiting circuit 22 generates a maximum inductor current level ILMax based on the designed maximum input current level IinMax, and limits amplitude of inductor current reference signal RefIL no more than maximum inductor current level ILMax. Inductor current control loop 23 receives inductor current feedback signal ILfb and inductor current reference signal RefIL, and provide a loop control signal CL via comparing inductor current feedback signal ILfb with inductor current reference signal RefIL. System voltage control loop 24 receives system voltage feedback signal Vsysfb and a system voltage reference signal RefVsy, and provides a loop control signal CV via comparing system voltage feedback signal Vsysfb with system voltage reference signal RefVsy. Switching control circuit 25 receives loop control signal CL and loop control signal CV, and provides control signal Ctrl based on loop control signal CL and loop control signal CV. In one embodiment, when system voltage control loop 24 takes effect, switching control circuit 25 controls switching circuit 11 in response to loop control signal CV to implement constant system voltage control, that is to maintain system voltage Vsys constant. When inductor current control loop 23 takes effect, if inductor current reference signal RefIL equals maximum inductor current level ILMax, switching control circuit 25 controls switching circuit 11 in response to loop control signal CL to implement constant input current control, that is to maintain input current Iin constant, and if inductor current reference signal RefIL is less than maximum inductor current level ILMax, switching control circuit 25 controls switching circuit 11 in response to loop control signal CL to implement constant charging current control, that is to maintain charging current Ibat constant.

Figure 3:
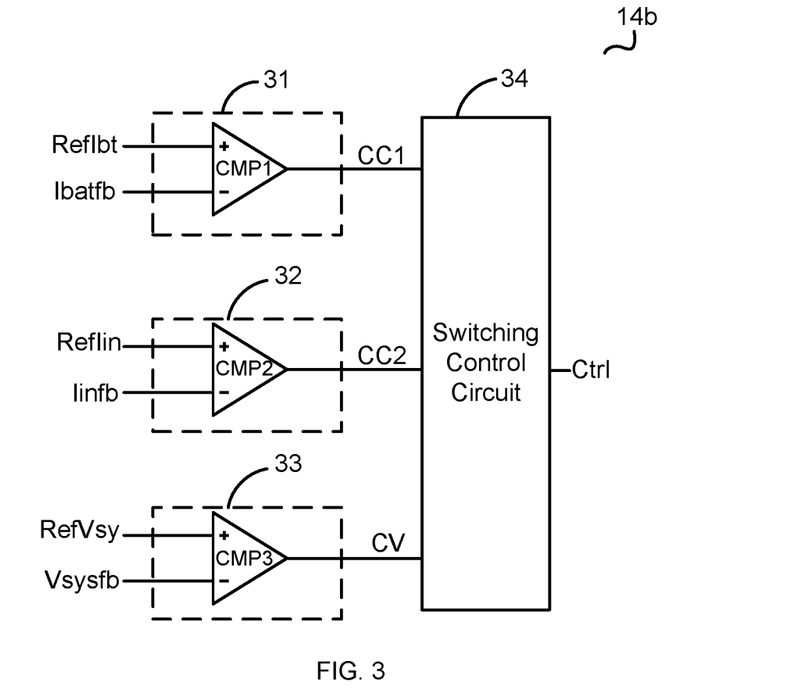
FIG. 3 schematically illustrates a control circuit 14b according to an embodiment of the present invention.

FIG. 3 schematically illustrates a control circuit 14b according to an embodiment of the present invention. Control circuit 14b comprises a charging current control loop 31, an input current control loop 32, a system voltage control loop 33, and a switching control circuit 34. Charging current control loop 31 employs a comparator CMP1 to provide a loop control signal CC1 via comparing charging current feedback signal Ibatfb with charging current reference signal Reflbt. Input current control loop 32 employs a comparator CMP2 to provide a loop control signal CC2 via comparing input current feedback signal Iinfb with input current reference signal RefIin. System voltage control loop 33 employs a comparator CMP3 to provide loop control signal CV via comparing system voltage feedback signal Vsysfb with system voltage reference signal RefVsy. Switching control circuit 34 provides control signal Ctrl based on loop control signals CC1, CC2, and CV. In the embodiment shown in FIG. 3, loop control signals CC1, CC2 and CV are logic signals at a high voltage level or a low voltage level, thus transition between each control loop is easier, and unexpected false transition is avoided.

Charging current feedback signal Ibatfb, input current feedback signal Iinfb and system voltage feedback signal Vsysfb are filtered to improve stability and anti-interference of system 100. However, when a processor current flowing into processor 13 increases dramatically, both system current Isys and input current Iin increase rapidly, and input voltage Vin decreases rapidly. In the embodiment shown in FIG. 3, even before input current feedback signal Iinfb is able to reflect decreased input current Iin in time, input voltage Vin may decrease less than an under voltage threshold, and the battery charging circuit would be shut down per under voltage protection. Control circuit 14a shown in FIG. 2 limits inductor current reference signal RefIL based on designed maximum input current level IinMax, thus limits maximum input current Iin via controlling inductor current IL, which avoids under voltage shut down of the battery charging circuit, and improves transient response performance and stability meanwhile.

Figure 4A:
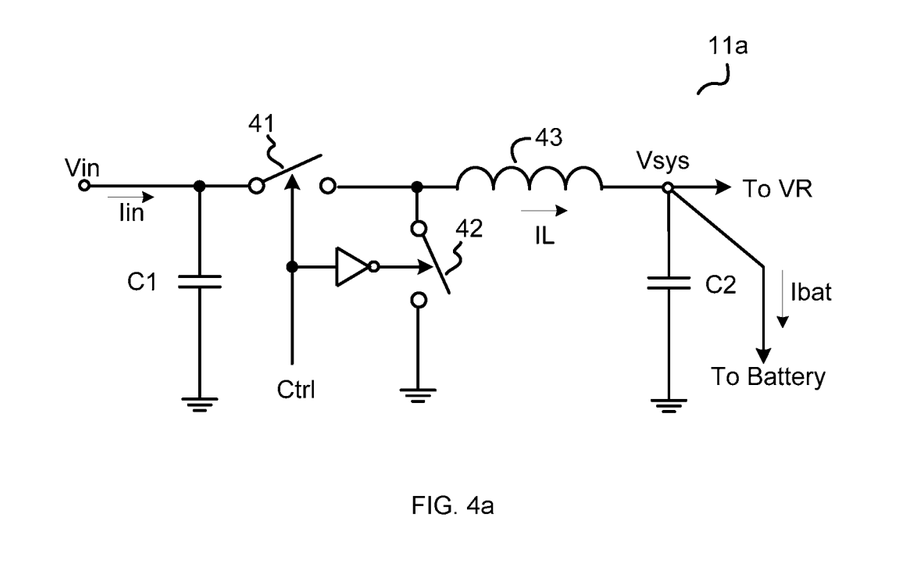
FIG. 4a-4c schematically illustrates a switching circuit 11 as shown in FIG. 1 according to an embodiment of the present invention.
Figure 4B:
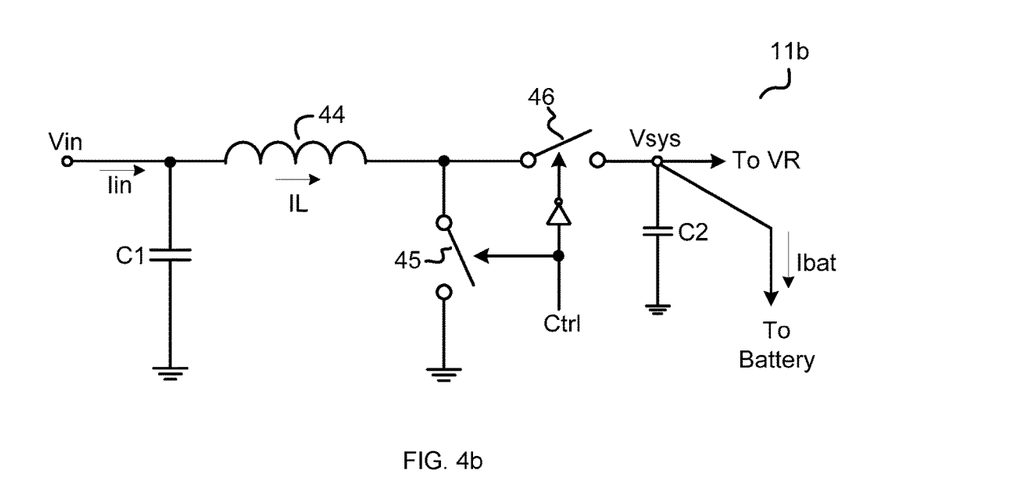
Figure 4C:
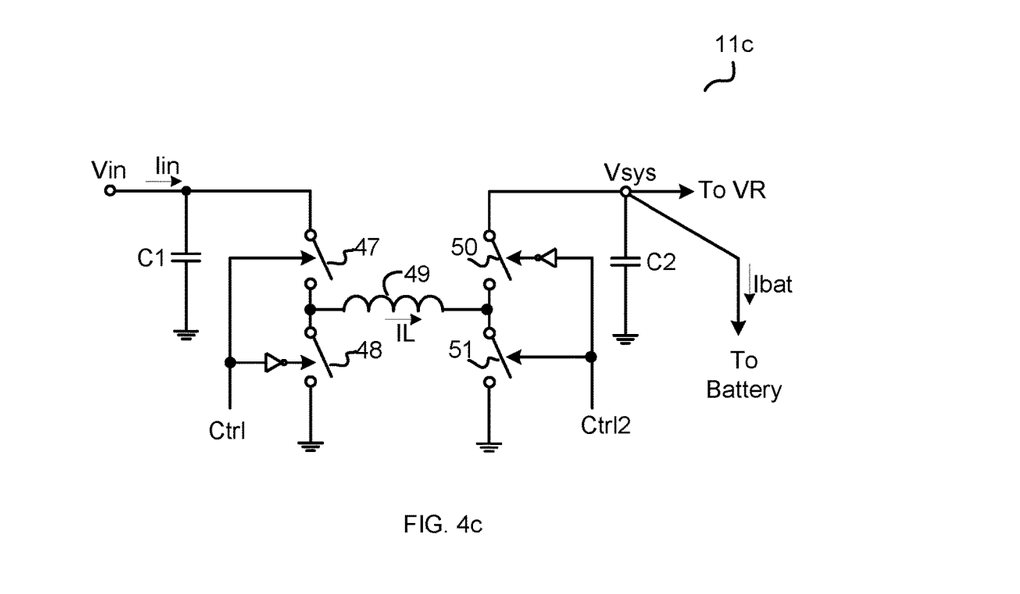

FIG. 4a-4c schematically illustrates switching circuit 11 as shown in FIG. 1 according to an embodiment of the present invention. One of ordinary skill in the art should appreciate that specific circuit structure of switching circuit 11 is not limited as FIG. 4a-4c shown, other circuits may be also used without detracting from merits of the present invention.

FIG. 4a shows a switching circuit 11a employing a step-down (Buck) circuit as one example. Switching circuit 11a comprises a capacitor C1 coupled between an input terminal of switching circuit 11a and a reference ground, a capacitor C2 coupled between an output terminal of switching circuit 11a and the reference ground, switches 41-42, and an inductor 43. Switch 41 has a first terminal coupled to the input terminal of switching circuit 11a, and a second terminal. Switch 42 has a first terminal coupled to the second terminal of switch 41, and a second terminal coupled to the reference ground. Inductor 43 has a first terminal coupled to the second terminal of switch 41 and a first terminal of switch 42, and a second terminal coupled to the output terminal of switching circuit 11a. Switches 41 and 42 are controlled by control signal Ctrl, and are turned ON complementary. In one embodiment, switch 42 may be substituted by a diode.

FIG. 4b shows a switching circuit 11b employing a step-up (Boost) circuit as one example. Switching circuit 11b comprises capacitor C1 coupled between an input terminal of switching circuit 11b and the reference ground, capacitor C2 coupled between an output terminal of switching circuit 11b and the reference ground, switches 45-46, and an inductor 44. Inductor 44 has a first terminal coupled to the input terminal of switching circuit 11b, and a second terminal. Switch 45 has a first terminal coupled to the second terminal of inductor 44, and a second terminal coupled to the reference ground. Switch 46 has a first terminal coupled to the second terminal of inductor 44 and the first terminal of switch 45, and a second terminal coupled to the output terminal of switching circuit 11b. Switches 45 and 46 are controlled by control signal Ctrl, and are turned ON complementary. In one embodiment, switch 46 may be substituted by a diode.

FIG. 4c shows a switching circuit 11c employing a Buck-Boost circuit as one example. Switching circuit 11c comprises capacitor C1 coupled between an input terminal of switching circuit 11c and the reference ground, capacitor C2 coupled between an output terminal of switching circuit 11c and the reference ground, switches 47-48, and 50-51, and an inductor 49. Switch 47 has a first terminal coupled to the input terminal of switching circuit 11c, and a second terminal. Switch 48 has a first terminal coupled to the second terminal of switch 47, and a second terminal coupled to the reference ground. Switch 50 has a first terminal coupled to the output terminal of switching circuit 11c, and a second terminal. Switch 51 has a first terminal coupled to the second terminal of switch 50, and a second terminal coupled to the reference ground. Inductor 49 has a first terminal coupled to the second terminal of switch 47 and the first terminal of switch 48, and a second terminal coupled to the second terminal of switch 50 and the first terminal of switch 51. Switches 47 and 48 are controlled by control signal Ctrl, and are turned ON complementary. Switches 50 and 51 are controlled by a control signal Ctrl2, and are turned ON complementary. In one embodiment, switch 48 and/or switch 50 may be substituted by a diode.

Figure 5:
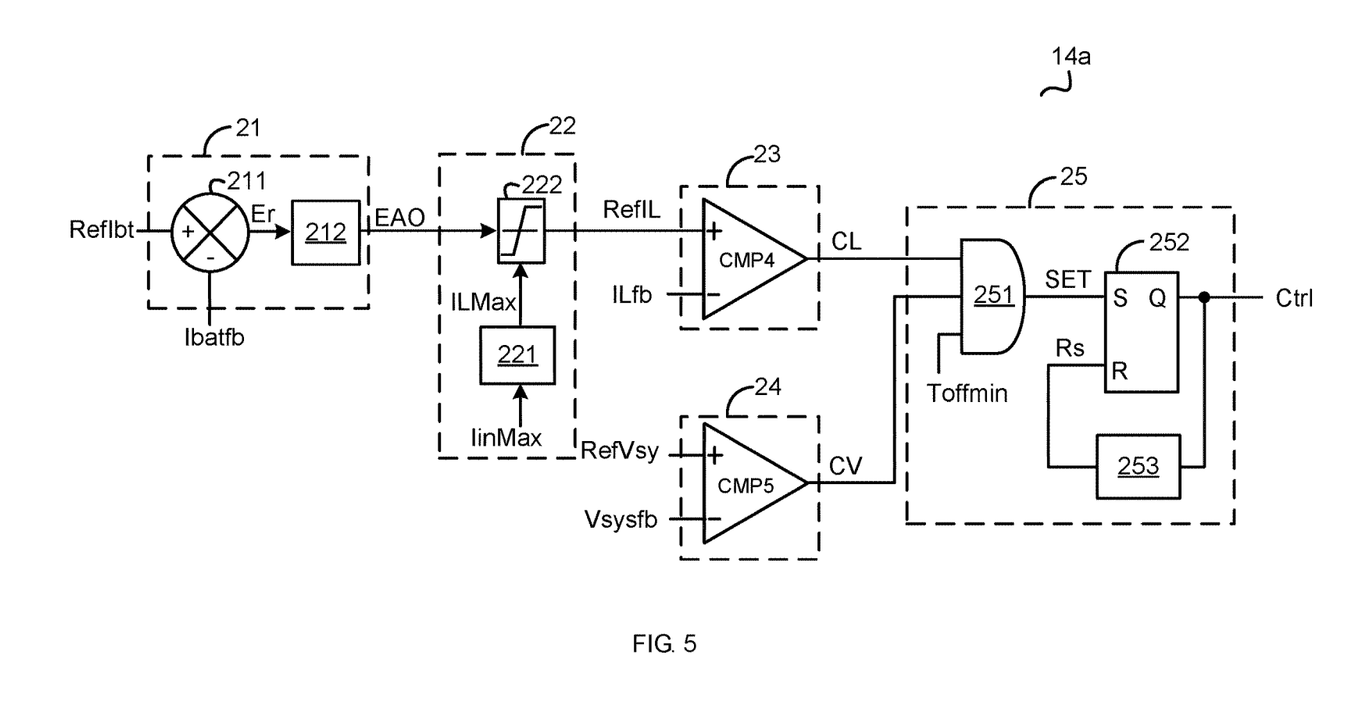
FIG. 5 schematically illustrates control circuit 14a as shown in FIG. 2 according to an embodiment of the present invention.

FIG. 5 schematically illustrates control circuit 14a as shown in FIG. 2 according to an embodiment of the present invention. Charging current control loop 21 comprises a calculating unit 211 and a compensating unit 212. Calculating unit 211 receives charging current reference signal Reflbt and charging current feedback signal Ibatfb, and provides an error signal Er based on the differential (Reflbt−

Ibatfb) between charging current reference signal ReIbt and charging current feedback signal Ibatfb. Compensating unit 212 receives error signal Er, and provides compensation signal EAO via conducting compensation on error signal Er, e.g., proportion-integration (PI) compensation, proportion-integration-differentiation (PID) compensation, and so on.

Amplitude limiting circuit 22 comprises a calculating unit 221 and an output unit 222. Calculating unit 221 provides maximum inductor current level ILMax based on designed maximum input current level IinMax. In one embodiment, maximum inductor current level ILMax equals a valley value of inductor current IL when an average of input current Iin equals designed maximum input current level IinMax. When switching circuit 11 is the step-down circuit as shown in FIG. 4a, maximum inductor current level ILMax is:

$$ILMax = IinMax/D1 - \Delta IL/2 \quad (1)$$

Where D1 is a duty cycle of switch 41, namely a ratio between an ON-time period of switch 41 and a switching period of switch 41, and $\Delta IL$ is a ripple of inductor current IL.

When switching circuit 11 is the step-up circuit as shown in FIG. 4b, maximum inductor current level ILMax is:

$$ILMax = IinMax - \Delta IL/2 \quad (2)$$

When switching circuit 11 is the Buck-Boost circuit as shown in FIG. 4c, maximum inductor current level ILMax is:

$$ILMax = IinMax/D2 - \Delta IL/2 \quad (3)$$

Where D2 is a duty cycle of switch 47, namely a ratio between an ON-time period of switch 47 and a switching period of switch 47.

Output unit 222 receives maximum inductor current level ILMax and compensation signal EAO, and provides inductor current reference signal RefIL based on maximum inductor current level ILMax and compensation signal EAO. When compensation signal EAO is larger than maximum inductor current level ILMax, inductor current reference signal RefIL equals maximum inductor current level ILMax; and when compensation signal EAO is less than or equals maximum inductor current level ILMax, inductor current reference signal RefIL equals compensation signal EAO.

Inductor current control loop 23 comprises a comparator CMP4. Comparator CMP4 has a non-inverting terminal, an inverting terminal, and an output terminal, wherein the non-inverting terminal of comparator CMP4 receives inductor current reference signal RefIL, the inverting terminal of comparator CMP4 receives inductor current feedback signal ILfb, and the output terminal of comparator CMP4 provides loop control signal CL via comparing inductor current feedback signal ILfb with inductor current reference signal RefIL. System voltage control loop 24 comprises a comparator CMP5. Comparator CMP5 has a non-inverting terminal, an inverting terminal and an output terminal, wherein the non-inverting terminal of comparator CMP5 receives system voltage reference signal RefVsy, the inverting terminal of comparator CMP5 receives system voltage feedback signal Vsysfb, and the output terminal of comparator CMP5 provides loop control signal CV via comparing system voltage feedback signal Vsysfb with system voltage reference signal RefVsy.

Switching control circuit 25 comprises an AND gate 251, a RS flip-flop 252, and an ON-time period control circuit 253. AND gate 251 has a first input terminal, a second input terminal, a third input terminal and an output terminal, wherein the first input terminal of AND gate 251 receives loop control signal CL, the second input terminal of AND gate 251 receives loop control signal CV, the third input terminal of AND gate 251 receives a minimum OFF-time signal Toffmin, and the output terminal of AND gate 251 provides a set signal SET via conducting an AND operation on loop control signal CL, loop control signal CV, and minimum OFF-time signal Toffmin. RS flip-flop 252 has a set terminal S, a reset terminal R and an output terminal Q, wherein set terminal S receives set signal SET, reset terminal R receives reset signal Rs, and output terminal Q provides control signal Ctrl. In one embodiment, when set signal SET is at the high voltage level, the at least one switch in switching circuit 11 is turned ON by control signal Ctrl, and when reset signal Rs is at the low voltage level, the at least one switch in switching circuit 11 is turned OFF by control signal Ctrl. ON-time control circuit 253 provides reset signal Rs to control an ON-time period of the at least one switch in switching circuit 11 equaling a predetermined time period.

One with ordinary skill in the art should appreciate that specific circuit structure of control circuit 14a is not limited as FIG. 5 shown. For example, signals that the inverting terminal and the non-inverting terminal of comparator CMP4 received may be interchanged to realize a same function with inversed logic level. In one embodiment, switching control circuit 25 may turn the at least one switch in switching circuit 11 OFF based on loop control signal CL and loop control signal CV, and switching control circuit 25 may control an OFF-time period of the at least one switch in switching circuit 11 based on the predetermined time period. In one embodiment, switching control circuit 25 may provide control signals Ctrl and Ctrl2 to control switching circuit as shown in FIG. 4c based on loop control signal CL and loop control signal CV. For example, when input voltage Vin is larger than a mode threshold, switching circuit 11c works at a step-down mode, switching control circuit 25 provides control signal Ctrl to control switches 47-48 based on loop control signals CL and CV, and switching control circuit 25 controls switch 50 maintaining ON and controls switch 51 maintaining OFF; and when input voltage Vin is less than the mode threshold, switching circuit 11c works at a step-up mode, switching control circuit 25 provides control signal Ctrl2 to control switches 50-51 based on loop control signals CL and CV, and switching control circuit 25 controls switch 47 maintaining ON and controls switch 48 maintaining OFF.

Figure 6:
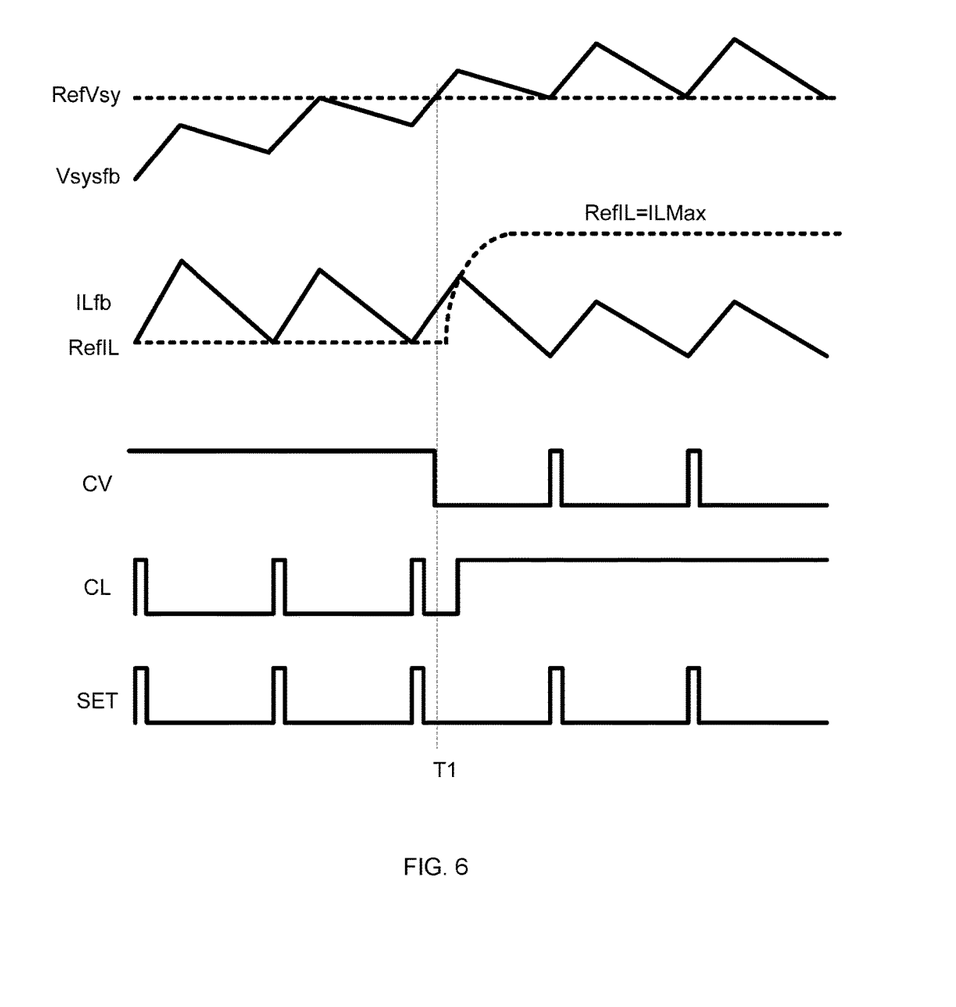
FIG. 6 shows waveforms of control circuit 14a as shown in FIG. 2 transiting from constant charging current control to constant system voltage control.

FIG. 6 shows waveforms of control circuit 14a as shown in FIG. 2 transiting from constant charging current control to constant system voltage control. Before time T1, system voltage feedback signal Vsysfb is always less than system voltage reference signal RefVsy, and system voltage control loop 24 provides loop control signal CV remaining at the high voltage level. When inductor current feedback signal ILfb is larger than inductor current reference signal RefIL, inductor current control loop 23 provides loop control signal CL at the low voltage level; and when inductor current feedback signal ILfb is less than inductor current reference signal RefIL, inductor current control loop 23 provides loop control signal CL at the high voltage level, and set signal SET varies in response to loop control signal CL. Inductor current reference signal RefIL is less than maximum inductor current level ILMax, and inductor current reference signal RefIL is controlled by control circuit 14a through charging current control loop 21, thus charging current Ibat is constant. At time T1, system voltage feedback signal Vsysfb is larger than system voltage reference signal RefVsy, system voltage control loop 24 provides loop control signal CV at the low voltage level. And then inductor current reference signal RefIL increases to maximum inductor current level ILMax, inductor current feedback signal ILfb keeps less than inductor current reference signal RefIL, loop control signal CL maintains at the high voltage level. When system voltage feedback signal Vsysfb is less than system voltage reference signal RefVsy, loop control signal CV becomes at the high voltage level, set signal SET varies in response to loop control signal CV. System voltage Vsys is controlled constant by system voltage control loop 24.

Figure 7:
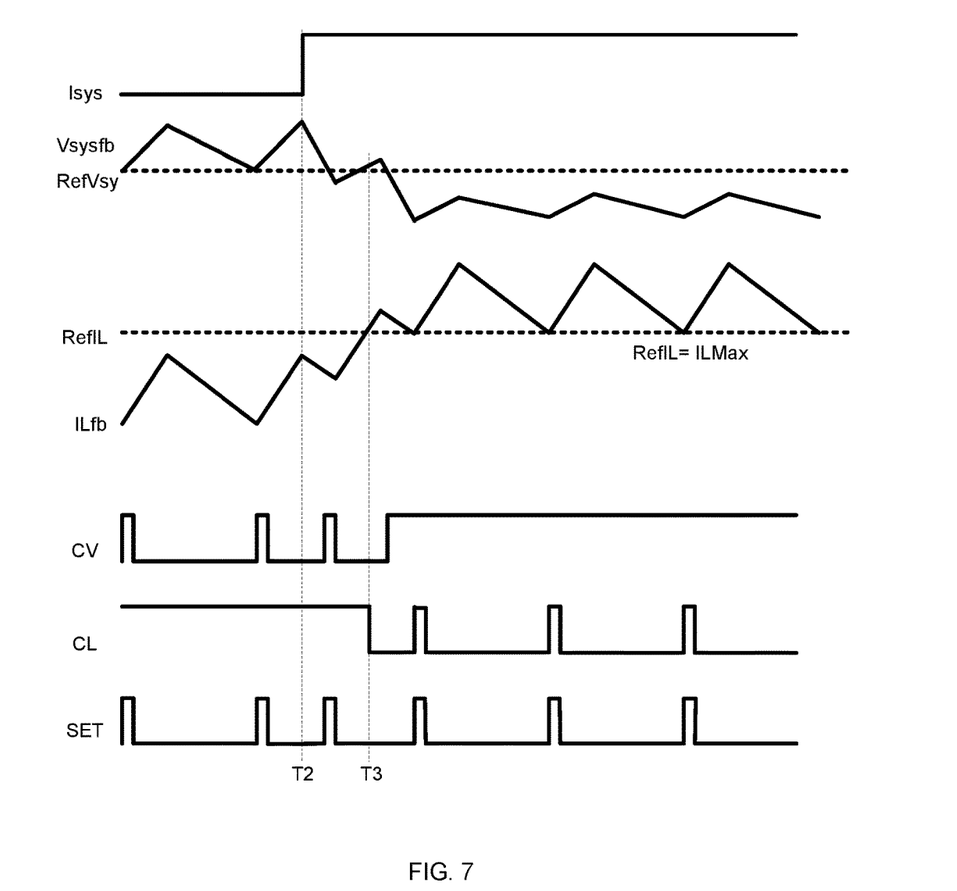
FIG. 7 shows waveforms of control circuit 14a as shown in FIG. 2 transiting from constant system voltage control to constant input current control.

FIG. 7 shows waveforms of control circuit 14a as shown in FIG. 2 transiting from constant system voltage control to constant input current control. Before time T2, system voltage Vsys is controlled constant by system voltage control loop 24, and inductor current reference signal RefIL equals maximum inductor current level ILMax. At time T2, system current increases dramatically, results in decreasing of system voltage feedback signal Vsysfb and increasing of inductor current feedback signal ILfb. Until time T3, inductor current feedback signal ILfb increases larger than inductor current reference signal RefIL, loop control signal CL transits to at the low voltage level, and system voltage feedback signal Vsysfb keeps less than system voltage reference signal RefVsy, loop control signal CV keeps at the high voltage level. When inductor current feedback signal ILfb is less than inductor current reference signal RefIL, loop control signal CL transits to at the high voltage level, set signal SET varies in response to loop control signal CL. Input current Iin is controlled constant by inductor current control loop 23.

Figure 8:
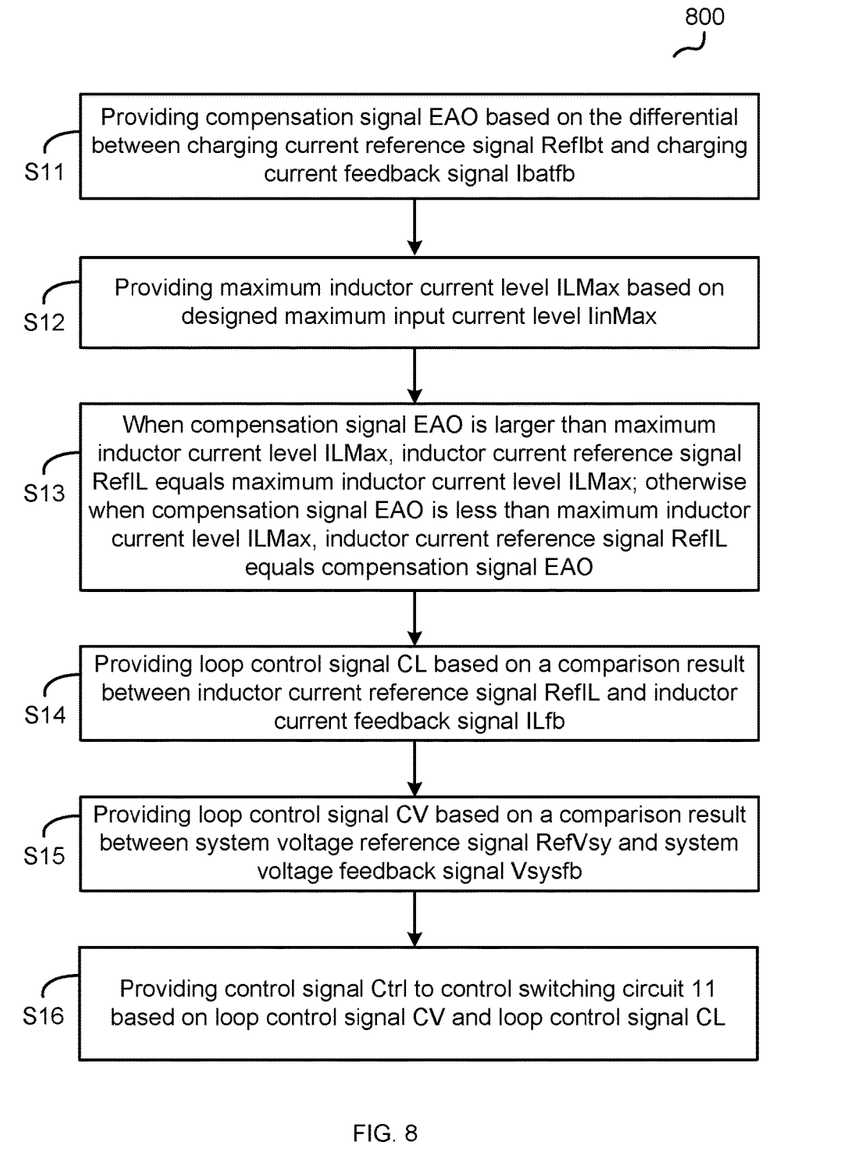
FIG. 8 shows a flow chart 800 for controlling a battery charging circuit according to an embodiment of the present invention.

FIG. 8 shows a flow chart 800 for controlling a battery charging circuit according to an embodiment of the present invention. Flow chart 800 comprises steps S11-S16.

At step S11, providing compensation signal EAO based on the differential (RefIbt−Ibatfb) between charging current reference signal RefIbt and charging current feedback signal Ibatfb.

At step S12, providing maximum inductor current level ILMax based on designed maximum input current level IinMax.

At step S13, when compensation signal EAO is larger than maximum inductor current level ILMax, inductor current reference signal RefIL equals maximum inductor current level ILMax; otherwise when compensation signal EAO is less than maximum inductor current level ILMax, inductor current reference signal RefIL equals compensation signal EAO.

At step S14, providing loop control signal CL based on a comparison result between inductor current reference signal RefIL and inductor current feedback signal ILfb.

At step S15, providing loop control signal CV based on a comparison result between system voltage reference signal RefVsy and system voltage feedback signal Vsysfb.

At step S16, providing control signal Ctrl to control switching circuit 11 based on loop control signal CV and loop control signal CL. For example, controlling the at least one switch in switching circuit 11 based on loop control signal CL and loop control signal CV.

In one embodiment, when control signal Ctrl is provided in response to loop control signal CV, system voltage control loop 24 takes effect, and system voltage Vsys is controlled constant; and when control signal Ctrl is provided in response to loop control signal CL, inductor current control loop 23 takes effect, if inductor current reference signal RefIL equals maximum inductor current level ILMax, input current Iin is controlled constant, and if inductor current reference signal RefIL is less than maximum inductor current level ILMax, charging current Ibat is controlled constant.

Note that in the flow chart 800 described above, the box functions may also be implemented with different order as shown in FIG. 8. Two successive box functions may be executed meanwhile, or sometimes the box functions may be executed in a reverse order. For example, step S15 may be executed before step S11-S14, or at the same time with step S11-S14.

While various embodiments have been described above, it should be understood that they have been presented by way of example only, and not limitation.

Thus, the breadth and scope of a preferred embodiment should not be limited by any of the above-described exemplary embodiments, but should be defined only in accordance with the following claims and their equivalents.

I claim:

1. A control circuit for a battery charging circuit, the battery charging circuit comprising a switching circuit having an inductor, the switching circuit has an input terminal configured to receive an input current and an output terminal configured to provide a system voltage, the output terminal of the switching circuit is further coupled to a battery to provide a charging current, the control circuit comprising:
   a charging current control loop, configured to receive a charging current feedback signal representative of the charging current, and configured to provide a compensation signal based on a differential between the charging current feedback signal and a charging current reference signal;
   an amplitude limiting circuit, coupled to the charging current control loop to receive the compensation signal, and configured to provide an inductor current reference signal based on the compensation signal and a designed maximum input current level, wherein amplitude of the inductor current reference signal is limited based on the designed maximum input current level;
   an inductor current control loop, configured to receive the inductor current reference signal and an inductor current feedback signal representative of an inductor current flowing through the inductor, and configured to provide a first loop control signal via comparing the inductor current feedback signal with the inductor current reference signal;
   a system voltage control loop, configured to receive a system voltage feedback signal representative of the system voltage, and configured to provide a second loop control signal via comparing the system voltage feedback signal with a system voltage reference signal; and
   a switching control circuit, configured to receive the first loop control signal and the second loop control signal, and configured to provide a control signal to control the switching circuit based on the first loop control signal and the second loop control signal.

2. The control circuit of claim 1, wherein the amplitude limiting circuit further comprises:
   a calculating unit, configured to provide a maximum inductor current level based on the designed maximum input current level; and
   an output unit, configured to receive the maximum inductor current level and the compensation signal, and configured to provide the inductor current reference signal based on the maximum inductor current level and the compensation signal; wherein when the compensation signal is larger than the maximum inductor current level, the inductor current reference signal equals the maximum inductor current level; and when the compensation signal is less than or equals the maximum inductor current level, the inductor current reference signal equals the compensation signal.

3. The control circuit of claim 1, wherein the amplitude limiting circuit is configured to provide a maximum inductor current level based on the designed maximum input current level, and the amplitude limiting circuit is configured to limit amplitude of the inductor current reference signal no more than the maximum inductor current level.

4. The control circuit of claim 3, wherein when the compensation signal is larger than the maximum inductor current level, the inductor current reference signal equals the maximum inductor current level, and when the compensation signal is less than or equals the maximum inductor current level, the inductor current reference signal equals the compensation signal.

5. The control circuit of claim 3, wherein:

when the system voltage control loop takes effect, the switching control circuit is configured to provide the control signal in response to the second loop control signal to maintain the system voltage constant;

when the inductor current control loop takes effect, and if the inductor current reference signal equals the maximum inductor current level, the switching control circuit is configured to provide the control signal in response to the first loop control signal to maintain the input current constant; and when the inductor current control loop takes effect, and if the inductor current reference signal is less than the maximum inductor current level, the switching control circuit is configured to provide the control signal in response to the first loop control signal to maintain the charging current constant.

6. The control circuit of claim 1, wherein when both of the first control signal and the second control signal becomes at a first state, the switching control circuit is configured to provide the control signal at the first state.

7. A battery charging circuit, comprising:

a switching circuit, having an inductor, the switching circuit has an input terminal configured to receive an input current and an output terminal configured to provide a system voltage, the output terminal of the switching circuit is further coupled to a battery to provide a charging current;

a charging current control loop, configured to receive a charging current feedback signal representative of the charging current, and configured to provide a compensation signal based on a differential between the charging current feedback signal and a charging current reference signal;

an amplitude limiting circuit, coupled to the charging current control loop to receive the compensation signal, and configured to provide an inductor current reference signal based on the compensation signal and a designed maximum input current level;

an inductor current control loop, configured to receive the inductor current reference signal and an inductor current feedback signal representative of an inductor current flowing through the inductor, and configured to provide a first loop control signal via comparing the inductor current feedback signal with the inductor current reference signal;

a system voltage control loop, configured to receive a system voltage feedback signal representative of the system voltage, and configured to provide a second loop control signal via comparing the system voltage feedback signal with a system voltage reference signal; and a switching control circuit, configured to receive the first loop control signal and the second loop control signal, and configured to provide a first control signal to control the switching circuit based on the first loop control signal and the second loop control signal.

8. The battery charging circuit of claim 7, wherein:

the amplitude limiting circuit is configured to provide a maximum inductor current level based on the designed maximum input current level;

when the compensation signal is larger than the maximum inductor current level, the inductor current reference signal equals the maximum inductor current level; and when the compensation signal is less than or equals the maximum inductor current level, the inductor current reference signal equals the compensation signal.

9. The battery charging circuit of claim 8, wherein the maximum inductor current level equals a valley value of the inductor current when an average of the input current equals the designed maximum input current level.

10. The battery charging circuit of claim 8, wherein the maximum inductor current level equals the designed maximum input current level minus half of a ripple of the inductor current.

11. The battery charging circuit of claim 7, wherein the switching circuit further comprises:

a first switch, having a first terminal, a second terminal and a control terminal, wherein the first terminal is coupled to the input terminal of the switching circuit, and the control terminal is configured to receive the first control signal; and a second switch, having a first terminal, a second terminal, wherein the first terminal is coupled to the second terminal of the first switch, and the second terminal is coupled to a reference ground; and wherein the inductor is coupled between the second terminal of the first switch and the output terminal of the switching circuit.

12. The battery charging circuit of claim 7, wherein the inductor has a first terminal coupled to the input terminal of the switching circuit and a second terminal, and wherein the switching circuit further comprises:

a first switch, having a first terminal, a second terminal and a control terminal, wherein the first terminal is coupled to the second terminal of the inductor, the second terminal is coupled to a reference ground, and the control terminal is configured to receive the first control signal; and a second switch, having a first terminal and a second terminal, wherein the first terminal is coupled to the second terminal of the inductor and the first terminal of the first switch, the second terminal is coupled to the output terminal of the switching circuit.

13. The battery charging circuit of claim 7, wherein the switching control circuit is further configured to provide a second control signal, and wherein the switching circuit further comprises:

a first switch, having a first terminal, a second terminal and a control terminal, wherein the first terminal is coupled to the input terminal of the switching circuit, and the control terminal is configured to receive the first control signal;

a second switch, having a first terminal and a second terminal, the first terminal is coupled to the second terminal of the first switch, and the second terminal is coupled to a reference ground;

a third switch, having a first terminal and a second terminal, wherein the first terminal is coupled to the output terminal of the switching circuit; and a fourth switch, having a first terminal, a second terminal and a control terminal, wherein the first terminal is coupled to the second terminal of the third switch, the second terminal is coupled to the reference ground, and the control terminal is configured to receive the second control signal; and wherein the inductor has a first terminal and a second terminal, the first terminal of the inductor is coupled to the second terminal of the first switch and the first terminal of the second switch, and the second terminal of the inductor is coupled to the second terminal of the third switch and the first terminal of the fourth switch.

14. The battery charging circuit of claim 7, wherein the amplitude limiting circuit further comprises:

a calculating unit, configured to provide a maximum inductor current level based on the designed maximum input current level; and an output unit, configured to receive the maximum inductor current level and the compensation signal, and configured to provide the inductor current reference signal based on the maximum inductor current level and the compensation signal.

15. A control method for a battery charging circuit, the battery charging circuit comprising a switching circuit having a switch and an inductor, the switching circuit has an input terminal configured to receive an input current and an output terminal configured to provide a system voltage, the output terminal of the switching circuit is further coupled to a battery to provide a charging current, the control method comprising:

providing a compensation signal based on a differential between a charging current feedback signal and a charging current reference signal, wherein the charging current feedback signal is provided based on the charging current;

providing a maximum inductor current level based on a designed maximum input current level;

providing an inductor current reference signal based on the compensation signal and the maximum inductor current level, wherein amplitude of the inductor current reference signal is limited no more than the maximum inductor current level;

providing a first loop control signal via comparing an inductor current feedback signal with the inductor current reference signal, wherein the inductor current feedback signal is provided based on an inductor current flowing through the inductor;

providing a second loop control signal via comparing a system voltage feedback signal with a system voltage reference signal, wherein the system voltage feedback signal is provided based on the system voltage; and providing a control signal to control the switching circuit based on the first loop control signal and the second loop control signal.

16. The control method of claim 15, wherein:

when the control signal is provided in response to the second loop control signal, the system voltage is controlled constant;

when the control signal is provided in response to the first loop control signal, and if the inductor current reference signal equals the maximum inductor current level, then the input current is controlled constant; and when the control signal is provided in response to the first loop control signal, and if the inductor current reference signal is less than the maximum inductor current level, then the charging current is controlled constant.

17. The control method of claim 15, wherein the maximum inductor current level is configured to vary inversely with a duty cycle of the switch.

18. The control method of claim 15, wherein the maximum inductor current level equals the designed maximum input current level minus half of a ripple of the inductor current.

19. The control method of claim 15, wherein the maximum inductor current level equals a valley value of the inductor current when an average of the input current equals the designed maximum input current level.

20. The control method of claim 15, wherein when the compensation signal is larger than the maximum inductor current level, the inductor current reference signal equals the maximum inductor current level, and when the compensation signal is less than or equals the maximum inductor current level, the inductor current reference signal equals the compensation signal.

* * * * *